United States Patent [19]

Bergendahl et al.

[11] Patent Number: 4,925,382
[45] Date of Patent: May 15, 1990

[54] ROLLER PRESS FOR COMPACTING FINE-GRAINED SALTS INTO SHEETS

[75] Inventors: Hans-Georg Bergendahl, Bochum; Kurt Zech, Unna; Raimund Zisselmar, Erftstadt, all of Fed. Rep. of Germany

[73] Assignee: Maschinenfabrik Koppern GmbH & Co. KG, Hattingen, Fed. Rep. of Germany

[21] Appl. No.: 223,224

[22] Filed: Jul. 22, 1988

[30] Foreign Application Priority Data

Jan. 26, 1988 [DE] Fed. Rep. of Germany ....... 3802173

[51] Int. Cl.⁵ .......................... B30B 11/18; B28B 3/16
[52] U.S. Cl. ..................................... 425/367; 264/118; 100/160; 100/169; 425/369
[58] Field of Search ................. 425/363, 367, 366, 79, 425/DIG. 235, 193-195, 375, 145, DIG. 101, 201; 264/175, 37, 118, 119, 122, 76, 349; 100/160, 169

[56] References Cited

U.S. PATENT DOCUMENTS

| | | | |
|---|---|---|---|
| 2,919,466 | 1/1960 | Roemer | 425/79 |
| 2,998,623 | 9/1961 | Lawson et al. | 425/363 |
| 3,497,321 | 2/1970 | Decker et al. | 425/363 |
| 3,570,054 | 3/1971 | Seanor et al. | 425/367 |
| 3,611,486 | 10/1971 | Fox | 425/363 |
| 3,635,637 | 1/1972 | Bergendahl | 425/363 |
| 3,781,151 | 12/1973 | Harris | 425/363 |
| 3,886,249 | 5/1975 | Manganaro | 264/118 |
| 3,988,095 | 10/1976 | Mersch et al. | 425/363 |
| 4,441,416 | 4/1984 | Tsutsumi | 100/160 |
| 4,519,188 | 5/1985 | Webster et al. | 100/169 |

FOREIGN PATENT DOCUMENTS

| | | | |
|---|---|---|---|
| 2419596 | 11/1974 | Fed. Rep. of Germany | 264/175 |
| 1133111 | 1/1985 | U.S.S.R. | 425/363 |

Primary Examiner—Jeffery Thurlow
Assistant Examiner—Mathieu Vargot
Attorney, Agent, or Firm—Ralph H. Dougherty

[57] ABSTRACT

A roller press for compacting fine-grained chemicals, especially salts, into sheets, having synchronously driven rollers with two axially spaced pressing surfaces on ring elements being provided with radial shoulders at both of their ends. Screw feeders for feeding the salt into the roll nip and wedge-shaped wall elements closing-off the roll nip in the axial direction on both ends of said ring elements and bearing against the shoulders, are also provided. Adjustment rods acting parallel to the roll axis are provided for the outer wall elements and vertical rods between the inner wall elements acting onto these wall elements via wedge-shaped surfaces arranged on said rods and the walls of said wall elements facing each other. The ring elements are integral with the roller bodies or separate cylindrical rings shrink-fit onto the roller bodies. Each ring element is associated with at least two screw feeders. The pressing surfaces of said ring elements are provided with ribs with interruptions in axial direction of the pressing surfaces. The ribs are each formed in a zig-zag shape including two spaced closed arrow tips leading in the direction of revolution.

13 Claims, 3 Drawing Sheets

ROLLER PRESS FOR COMPACTING FINE-GRAINED SALTS INTO SHEETS

BACKGROUND OF THE INVENTION

The invention relates to a roller press apparatus for compacting fine-grained particulate chemicals, particularly salts, into sheets. The press has synchronously driven rollers with profiled surfaces, screw conveyors for feeding the particulate chemical products into the roll nip, wedge-shaped wall elements which close off the roll nip in the axial direction on both sides and bear against the end faces of the rollers in the circumferential region, and adjustment rods, adapted to act parallel to the roller axes to properly position the wall elements.

DESCRIPTION OF THE PRIOR ART

Roller presses similar to those of this invention are used in a process which is described in U.S. Pat. No. 4,439,384. In this prior art process, the material to be compacted is charged at a temperature higher than 125° C., and the roller surface is held at a temperature lower than 80° C. Using this process, high-strength sheets can be produced from fine-grained salts having normal particle size distribution characteristics, which can be comminuted or crushed into granules of high abrasion resistance.

It is generally known (for instance in German Auslegeschrift 1,250,799 or the journal "Aufbereitungstechnik", 1967, No. 2, pages 80 to 84) that there is a particular problem in the compacting of fine-grained salts, especially potash salts, in that the material which is fed to the roller press has a high air content.

This causes increasing difficulties in venting of the salt in the roll nip during the compaction process. The entrained air has increasing difficulty in escaping as the grain size of the salt particles which are to be compacted decreases. Thus, it is known that sheets which are continuous across the width of the rollers are not formed on presses with smooth rollers. At best, with smooth rollers, ribbons of compacted material develop which extend in the circumferential direction and between which there is uncompacted or only slightly compacted material. These intermediate uncompacted areas act as venting channels for escaping air.

Roller presses for the compaction of fine-grained salts are normally provided with compaction rolls having relatively large working widths. The working width normally corresponds to the roller diameter but is preferably greater than the roller diameter. Thus, for example, for the compaction of fine-grained salts, roller presses having roller diameters of 1,000 mm and a working width of 1,250 mm are common. With such a press, five screw conveyors are provided, the outlets of which are located side by side and are alternately inclined relative to the vertical plane through the roll nip. In the case of fine-grained salts having particle size distributions of 75 to 85% smaller than 0.4 mm (35 memsh) and 40% smaller than 0.2 mm (65 mesh), only sheets of inadequate quality can be produced, even if the compacting force is substantially increased. Thus, for example, about 25 tonnes of useful granules are produced per hour at a power input of 110 to 130 A and at a compaction force which is substantially above the normal compaction force of 45 to 55 kN/cm of roller width.

OBJECTS OF THE INVENTION

It is the object of this invention to provide a roller compaction apparatus of the generic type, by which particulates, and even very fine-grained salts, can be compacted into sheets of high quality, from which granules of high abrasion resistance can be produced.

It is also an object of this invention to provide a roller compaction apparatus that can be effectively operated at low power input under normal compacting pressure.

SUMMARY OF THE INVENTION

According to the invention, the foregoing objects are achieved by providing a roller press, including two driven rollers arranged side by side and having parallel axes, the body of each roller having a circumferential pressing surface, the space between the adjacent pressing surface forming the roll nip. Each roller body is provided with radial shoulders at the axial ends of its compacting areas. A plurality of ring strips, with wedge-shaped wall elements, which close off the roll nip in the axial direction on both sides, bear against each of the ring strips, and wherein at least one screw conveyor is associated with each ring strip.

BRIEF DESCRIPTION OF DRAWINGS

The invention is better understood with reference to the following detailed description and the appended drawings, in which.

DESCRIPTION OF THE PREFERRED EMBODIMENT

Figure 1:
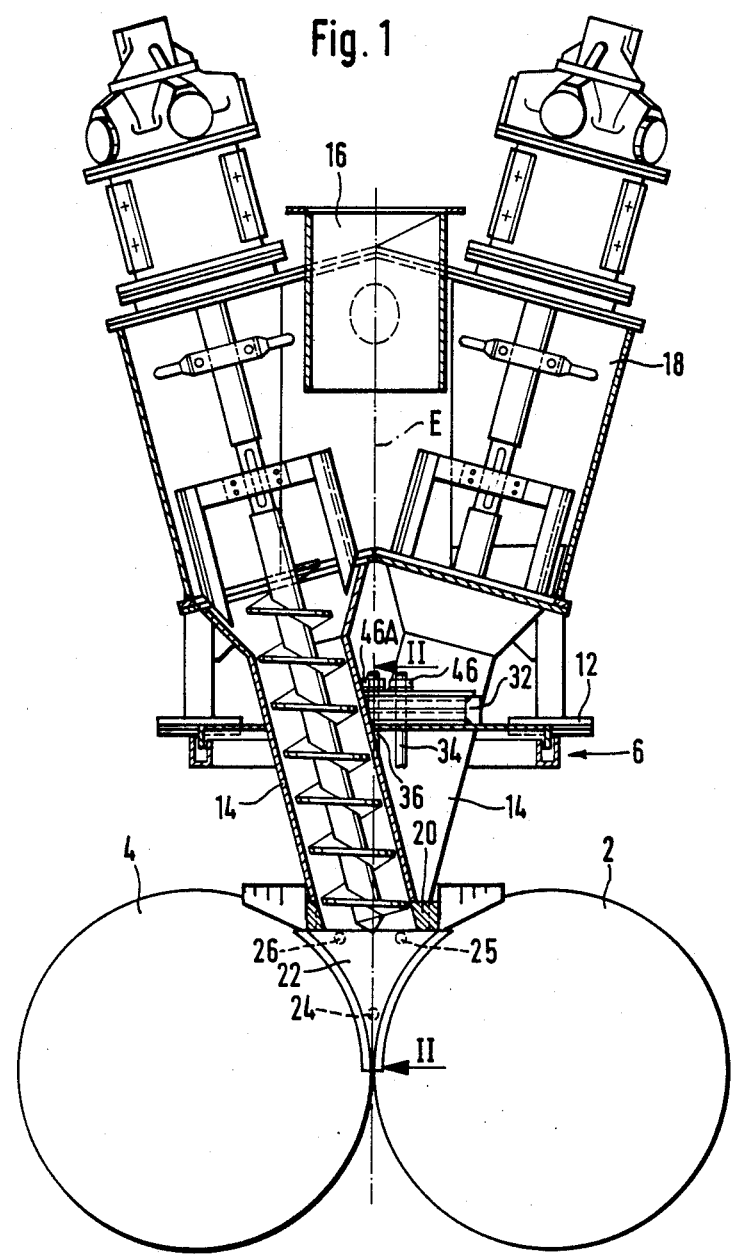
FIG. 1 is a sectional view of the invented roller press apparatus taken along the line I—I in FIG. 2.

The roller compactor shown in the drawings is of a known type of basic construction. It has, side by side, two synchronously driven compact rollers 2, 4, which are mounted in a conventional manner in a frame 6. The ends of the rollers are journaled for rotation in roller bearings in bearing housings 8, by means of which they are arranged between an upper and a lower frame member, one of the rollers being displaceable with its bearing housings.

Rollers 2, 4 are each provided with pressing surfaces spaced in the axial direction of the roll body. In the preferred embodiment shown in the drawings, the pressing surfaces are the outer cylindrical surfaces of rings 28, 28A, which are advantgeously positioned and secured onto the roll body by shrink-fitting. These rings 28, 28A have a radial shoulder 27, 29; 27A, 29A on each of their ends. Alternatively, it is possible to form suitable rings with radial shoulders integral with the core roller body. In this case, a wear-resistant outer working surface can be applied to the outer surface of each ring integral with the roller body by means such as welding.

Between the upper frame members 10, a bridge 12 is located, on which, as shown in FIG. 1, screw feeders or conveyors are mounted, the housings 14 of which form separate charge hoppers for each screw feeder. The particulate material to be compacted is fed into the roll nip via these charge hopperes. The charge hoppers 14 are directly adjacent each other in the direction of the roll axes. The screw feeders are alternately oppositely inclined relative to the plane E through the center of the roll nip, which is perpendicular to the plane of the roller axes. Details of the screw feeders or conveyors are known in the art. The fine-grained particulate material to be compacted, especially salts, and hereinafter referred to as "salts", passes via an inlet 16 into an intermediate bunder 18, from which the screw feeders move the salt into the roll nip. The ends of the charge hoppers 14 are fixed in a plate 20 which forms a feed zone between the plate 20, the roll pressing surfaces, and the roll nip, and closes the top of the feed zone, creating a seal.

At each of the ends of the rollers 2 and 4, outer wedge-shaped wall elements 22 are provided, which form end seals to the feed zone by bearing against the radial outer shoulders of the rings on the roller bodies. The wall elements 22 are adjustably positioned and are pressed on by horizontal thrust bolts 24, 25, 26 and 24A, 25B and 26B which are mounted in the press frame in the region between the bearing housings 8.

Figure 2:
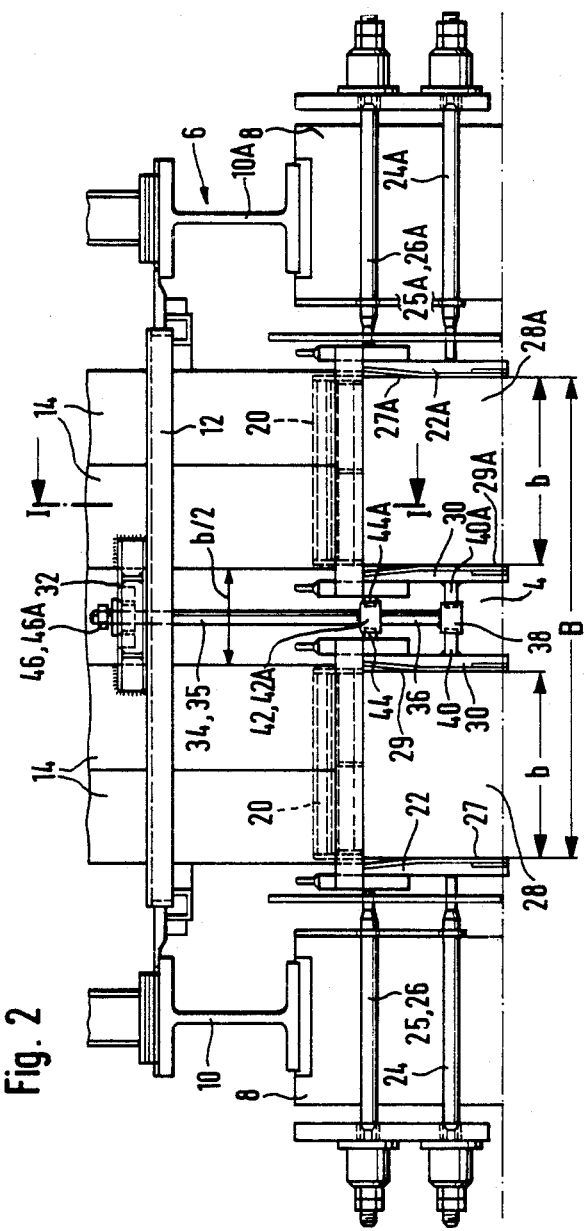
FIG. 2 is a sectional view of the roller press taken along the line II—II in FIG. 1.

As shown in FIG. 2, two rings 28, 28A are provided on each roller body 2, 4, spaced axially (or side by side). The wedge-shaped wall elements 22 bear against the outer shoulders 27, 27A of these rings facing away from each other. Two further wedge-shaped inner wall elements 30, 30A bear against the shoulders 29, 29A of the two rings 28, 28A, facing each other at the inner ends of the two rings.

In order to press these wedge-shaped wall elements 30, 30A into place and to adjust them, three tension bars 34, 35, 36, of which two are indicated in Figure by their upper ends, are mounted side by side in a bridge member 32 arranged transversely to, and preferably mounted on the bridge 12. The bar 36 is preferably located in the plane E, whereas the two other bars, of which only one is shown in FIGS. 1 and 2, are located on both sides of said plane E. The tension bar 36 located in the plane E carries, at its lower end, a wedge- or cone-shaped collar 38 which interacts with corresponding cone- or wedge-shaped surfaces 40, 40A on the outside of the inner wedge-shaped wall elements 30, 30A in the lower region thereof. The two outer tension bars 34, 35 are each provided with corresponding cone- or wedge-shaped collars 42 which interract with corresponding cone- or wedge-shaped surfaces 43, 43A and 44, 44A located in the upper region of the wall elements 30, 30A. The contact pressure onto the wedge-shaped wall elements 30, 30A is effected by vertical adjustment of the tension bars 34, 36 by means of nuts 46, 46A resting on the top of the bridge 32. The tension bars 34, 35 with their collars 42, 42A thus fulfill the functions of the adjustment and thrust bolts 25, 26, whereas the tension bar 36 with its collar 38 fulfills the function of the adjustment and thrust bolt 24. Instead of tension bars also thrust bars may be provided.

As a result of providing the two axially spaced rings 28 with their outer working or pressing surfaces, the total width B of the roller body is divided into two working widths b. For example, B may be 2.5 b, as shown, thus the interspace between the two rings has a width of b/2.

Compared with a conventional roller compactor having a working width B, where B equals, for example, 1,250 mm, the effective working width of the two rollers 2 and 4 is reduced to 2b by the design described. This means a reduction of the effective working width by 20%.

Two screw feeders, the charge hoppers 14 of which are diagrammatically indicated in FIG. 2, are allocated to each of the two rings 28, 28A. As shown in FIG. 1, the bridge 32 is located between the two adjacent charge hoppers 14 of the two adjacent screw feeders.

By using two rings, each having a width b equal to 0.4 B, it is possible to achieve higher pressing forces compared with a known roller compactor with a single ring and a working width B. For example, in a roller press which was originally designed with a working width B and a pressing force of 55 kN/cm, a pressing force which is 20% higher, i.e. about 66 kN/cm, can be obtained at the same press loading.

In tests comparing a roller press according to the prior art having a roller diameter of 1,000 mm and a working width B equal to 1,250 mm being provided with five screw feeders (Press A) and a roller press according to the teachings of this invention (Press B), having a total working width of the two rings of 0.8 B, each being provided with two screw feeders, it was found that with Press B operating with pressing forces within the design range of Press A, thus with specific pressing forces in Press B in the order of magnitude of 66 kN/cm, a substantially improved production rate was achievable with a substantially reduced power input and a substantial improvement in sheet quality. Thus, with Press B, continuous sheets of high quality having a thickness of 15 to 16 mm were produced without difficulty. Granules produced from these sheets have a high abrasion resistance.

Using Press A, it was possible to reach a production rate of about 25 tonnes/hour of granules from very fine-grained potassium salts with a particle size distribution of 75 to 85% smaller than 0.4 mm (35 mesh) and 40% smaller than 0.2 mm (65 mesh) at compaction forces that had to be increased beyond 66 kN/cm right up to the safety limit of the press. With Press A, an electrical power input of 110 to 130 A was measured. In the case of Press B, the production rate starting from the same salt was about 35 tonnes/hour of granules at an electrical power input of 60 to 70 A. Thus, a 20% increase in the production rate was achieved with about a 50% reduction in power input. The invented press was distinguished by very quiet operation with minimal vibration. The increase in throughput rate was achieved in spite of the fact that Press B was operated with only four screw feeders and thus 80 % of the feeder capacity of Press A.

Figure 3:
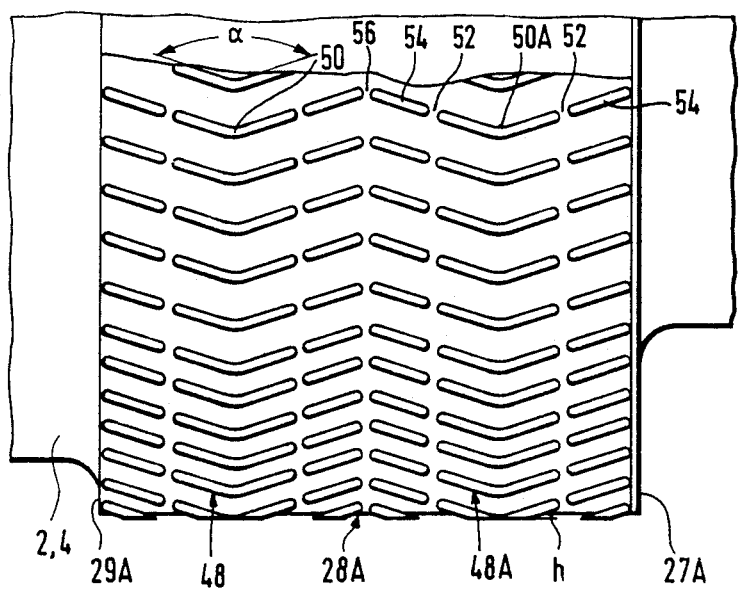
FIG. 3 is an enlarged plan view of a roller surface showing details of ribs on the pressing surface.

For the test set forth above, the pressing surface of the ring of Press A was provided with a shallow profile having a profile depth of only 5 mm, and Press B was provided with upstanding ribs welded onto the pressing surfaces as shown in FIG. 3 by schematic representation of the pressing surface of one of the rings.

Thus, a further increase in output can be achieved by a special arrangement of ribs on the press surfaces of the rollers, as is illustrated in FIG. 3 by the representation of one of the pressing surfaces. The ribs (or profiling ) may be arrow-shaped interrupted ribs 48 with arrow tips in the direction of revolution of the roller, which produces a downward flow of sheet product.

The arrow tips 50, which point in the direction of revolution of the roller in the press, are preferably of closed design. The arms of these arrow tips 50 are continued after interruptions 52 by arm sections 54. Preferably, two such profilings 48, 48A which are of identical design and the arms 54 of which each adjoins an interspace 56 at their mutually facing ends, are provided side by side, i.e. following the axial direction of the rollers. The arms 54 located near the shoulders of the rings are preferably at a small distance from the shoulders or end faces of the rings, so that there is again an interspace between these arms and the wall elements 22, 30, respectively, which close off the roll nip. The height h of the ribs being building-up weldings on the outer ring or pressing surface is about 3 mm. The order of magnitude of the tip angle a is preferably between 130° and 150°, advantageously about 140°.

As a result of the profile or rib arrangement described, air entrapped in the material flows along the arrow-shaped ribs and escapes via the interrptions 52, 56 in the ribs. This provides substantial improvement in venting of the material and results in a sheet which has been very uniformly and thoroughly compacted.

What is claimed is:

1. A roller press for compacting fine-grained chemical products, especially salts, into sheets, said roller press comprising:
   a press frame having upper and lower frame members;
   two motor-driven roller bodies arranged side by side in said press frame and having parallel horizontal axes, the axial ends of said rollers being journaled for rotation in roller bearings in bearing housings, by means of which they are arranged between an upper and lower frame member, one of the rollers being displaceable with its bearing housing between said upper and lower frame member;
   each roller body being provided with two profiled pressing surfaces, said two pressing surfaces being axially spaced on said roller bodies forming two roller nips, each roller body having radial shoulders at the axial ends of each of said pressing surfaces;
   at least one screw feeder means being provided for each of said two pressing surfaces for feeding the fine-grained products into the roller nips of said two pressing surfaces;
   inner and outer wedge-shaped wall elements having inner and outer surfaces, said wall elements closing the roller nips in the axial direction of said rollers on both ends of each of said pressing surfaces with said inner surfaces bearing against said radial shoulders, and means for applying pressure against said outer surfaces for causing said wedge-shaped walls elements to bear against said radial shoulders;
   said pressure applying means for said inner wedge-shaped wall elements bearing against shoulders between said two pressing surfaces facing each other comprising bars carried by said press frame arranged vertically in the space between said inner wedge-shaped walls elements and being vertically adjustable, said bars being provided with wedge-shaped surfaces adapted to contact corresponding wedge-shaped surfaces provided on said outsides of both of said inner wall elements, said bars causing said inner wedge-shaped wall elements to bear against said adjacent shoulders.

2. A roller press according to claim 1, wherein said pressing surfaces are the outer surfaces of cylindrical rings.

3. A roller press according to claim 1, wherein said pressing surfaces are provided with a shallow profile.

4. A roller press according to claim 3, wherein the shallow profile has interrupted ribs which are arrow-shaped in the direction of revolution of said roller bodies.

5. A roller press according to claim 4, wherein the tip angle of the arrow-shaped ribs is between 130° and 150°.

6. A roller press according to claim 4, wherein the ribs are each formed in a zig-zag shape extending in the axial direction including two spaced arrow tips leading in the direction of revolution.

7. A roller press according to claim 6, wherein the ribs are formed with closed arrow tips leading in circumferential direction.

8. A roller press according to claim 4, wherein the ribs are welded onto the pressing surface of said ring with a height of about 3 mm.

9. A roller press according to claim 1, wherein said pressing surfaces have an axial width of about 450 to 550 mm.

10. A roller press according to claim 1, wherein said screw feeders associated with each pressing surface are providd with separate charge hoppers.

11. A roller press according to claim 1, wherein said pressing surfaces have an axial width of about 450 to 550 mm and wherein for each pressing surface two screw feeders are provided, the feeders associated with each of the two pressing surfaces being provided with separate charge hoppers.

12. A roller press according to claim 1, wherein said wedge-shaped surfaces are conical surfaces.

13. A roller press according to claim 2, wherein said cylindrical rings are shrink-fit onto cylindrical surfaces of said roller bodies.

* * * * *